United States Patent
Kalousdian et al.

(10) Patent No.: US 6,436,271 B1
(45) Date of Patent: Aug. 20, 2002

(54) PREPARATION OF MINERAL MATRICES BY COLD CRUCIBLE INDUCTION MELTING

(75) Inventors: Philippe Kalousdian, Issy les Moulineaux; Patrick Cantin, Neuilly sur Seine, both of (FR)

(73) Assignee: Societe Generale pour les Techniques Nouvelles S.G.N. (FR)

( * ) Notice: Subject to any disclaimer, the term of this patent is extended or adjusted under 35 U.S.C. 154(b) by 0 days.

(21) Appl. No.: 09/354,074

(22) Filed: Jul. 15, 1999

(30) Foreign Application Priority Data

Jul. 16, 1998 (FR) ............................. 98 09090

(51) Int. Cl.⁷ ................................ C25B 1/00
(52) U.S. Cl. .................... 205/358; 205/360; 205/362; 588/12; 588/14; 588/15
(58) Field of Search .................... 588/2, 11, 1, 14, 588/12, 15, 10, 16; 205/47, 357, 358, 360, 362, 363, 364

(56) References Cited

U.S. PATENT DOCUMENTS

| | | | | |
|---|---|---|---|---|
| 5,424,042 A | * | 6/1995 | Mason et al. ................ | 422/159 |
| 5,564,102 A | * | 10/1996 | Igarashi et al. ................ | 588/11 |
| 5,640,702 A | * | 6/1997 | Shultz ............................ | 588/1 |
| 5,882,581 A | * | 3/1999 | Gotovchikov et al. ...... | 266/241 |

FOREIGN PATENT DOCUMENTS

| | | |
|---|---|---|
| EP | 0820962 | 1/1998 |
| EP | 0847061 | 6/1998 |
| FR | 2331759 | 6/1977 |
| GB | 1541587 | 3/1979 |

* cited by examiner

Primary Examiner—Stanley S. Silverman
Assistant Examiner—Edward M. Johnson
(74) Attorney, Agent, or Firm—Bierman, Muserlian and Lucas

(57) ABSTRACT

The aim of the present invention is a process for preparing a mineral matrix by melting, which is implemented according to the method of direct cold crucible induction melting. The method employs a step for initiating the melting. During the initiation step, a conductive mineral load is generated, by introduction of constituent elements of the matrix, into a bath of a conductive liquid, brought by induction to a suitable temperature, in the cold crucible. The intervening conductive liquid has the property of being a liquid and an electric conductor at a temperature between $\theta_1$ of less than 600° C., advantageously of between 100 and 500° C., and a temperature $\theta_2$ at least equal to the temperature at which the constituent elements of the matrix melt to generate the matrix. The conductive liquid is advantageously a molten sodium hydroxide bath. The preparation of such a glass matrix is advantageously implemented within the context of a method of vitrifying radioactive waste materials.

17 Claims, No Drawings

PREPARATION OF MINERAL MATRICES BY COLD CRUCIBLE INDUCTION MELTING

The present invention relates to the preparation of mineral matrices by cold crucible induction melting. More specifically, the present invention relates to a process for preparing a mineral matrix by melting, which is implemented according to the method of direct cold crucible induction melting, said method comprising an initiation step for initiating the melting.

Within the context of the present invention, an innovation is in fact proposed of the implementation of said method of direct cold crucible induction melting; a method known per se. This innovation is found in the initiation of said melting.

Said method of direct cold crucible induction melting, for preparing mineral matrices, can be implemented in various contexts, and notably in that of the preparation of glass matrices. Such glass matrices fall more particularly within the context of methods of vitrifying radioactive waste materials. The present invention is described especially with reference to this context. The present invention is however in no way limited to said context.

In the method of vitrifying radioactive waste materials, said waste materials are mixed with molten glass inside a crucible which is heated, notably by induction. Said crucible is continuously fed with glass frit and with waste materials.

In the method of hot crucible melting, the power is transmitted, by conduction, to the load (molten glass+waste materials) which is in contact with the wall of the crucible. Said wall is itself heated by the Joule effect; this Joule effect is produced by the passage of Foucault currents which are induced in said wall. A device which is suitable for the implementation of such a method is described in the EP-A-0 196 809 patent application. Such a process is currently carried out in the Cogema (Compagnie Générale des Matiéres Nucleaires) vitrification workshops in La Hague, France.

In the most recent process of direct cold crucible induction melting, the wall of the crucible is cooled by a current of cooling water which circulates in channels set up to this end within said wall. The power is transmitted directly to the load (molten glass+waste materials) by the Joule effect, this Joule effect being produced by the circulation of Foucault currents which are induced directly into the molten glass, which is an electric conductor in this (molten) state.

Thus, for the initiation of such a process of melting, by direct cold crucible induction, said cold crucible containing (for said initiation) cold glass, the heating cannot be obtained by induction in said cold glass, which is a non-conductor in this state. It is therefore necessary, a priori, to rely on additional heating means for said initiation.

It is recommended to introduce, into the bed of cold (non-conductor) glass, an electric conductor element (of the metal ring or metal turnings type) in which element the currents induced can circulate causing, by the Joule effect, a progressive warming up until the initiation of the combustion of the metal which spreads closer and closer in causing the melting of the neighbouring glass, this glass undergoing melting in which induced currents develop progressively in turn, until the complete melting of said glass. The introduction of such a conductive element into a radioactive environment is susceptible to give rise to a few difficulties, mainly mechanical difficulties. A process of this type is described in the EP-A-0 640 992 patent application: a part of the waste materials to be vitrified themselves constituting the electric conductor element and another part of these consisting of vitreous substances.

It has also been envisaged, for the initiation of a process of direct cold crucible induction melting, to have recourse to heating means which are different from inductive heating means: burner(s), microwaves, electrodes, arc The intervention of such additional heating means also poses problems:
said means hinder the inside and/or the outside of the cold crucible,
they complicate the procedures of use and of maintenance of said cold crucible.

The two approaches which are presented above require, in any case, particular fittings as regards the structure of the cold crucible and as regards its use.

Confronted with this technical problem of the initiation of the processes of vitrifying radioactive waste materials by melting, by direct cold crucible induction, and more generally with the technical problem of the initiation of the direct cold crucible induction melting, the Applicant proposes, within the context of the present invention, an original solution. This original solution is based on the prior intervention, within the cold crucible, of a conductive liquid.

The process of the invention—a process for preparing a mineral matrix by melting, which is implemented according to the method of direct cold crucible induction melting and which includes an original initiation step, for initiating said melting—characteristically comprises, during said initiation step, the constitution, in said cold crucible, of a conductive mineral load, by introduction of constituent elements of said matrix, into a conductive liquid bath, brought by induction to a suitable temperature. By virtue of the temperature rise of said conductive liquid bath, it is possible, by using only the means of inductive heating, to directly constitute a conductive mineral load in the cold crucible. This result can only be obtained if said intervening conductive liquid is liquid and a conductor, over a relatively wide temperature range between a temperature $\theta_1$ of less than 600° C., advantageously of between 100 and 500° C., and a temperature $\theta_2$ at least equal to the temperature at which the constituent elements of the matrix melt to generate said matrix.

The interest of such a wide temperature range is conceived insofar as it is sought:
on the one hand, to easily and rapidly obtain said conductive liquid in the cold crucible. This condition fixes the lower value $\theta_1$ of said temperature range. It has been seen that, reasonably, $\theta_1$ is of less than 600° C., that it is advantageously of between 100 and 500° C. The lower said temperature 0, the easier it is to implement the initiation of the process according to the invention;

and on the other hand, to melt the added constituent elements of the matrix in said conductive liquid; it being necessary for such a melting to be operated before the degradation and/or evaporation of said conductive liquid. This condition fixes the upper value $\theta_2$ of said temperature range. It is easily understood that this value $\theta_2$ is a function of the nature of the intervening constituent elements, and hence of the mineral matrix under melting sought after. It will be seen later on that the process of the invention is more particularly adapted for preparing matrices of glass, of enamel and of ceramic. It may be indicated here in an illustrative manner that within the context of the preparation of a matrix of glass undergoing melting, $\theta_2$ is at least equal to 1,000° C., advantageously at least equal to 1,300° C. It is altogether possible at these temperatures to prepare a glass undergoing melting from its constituent elements, of the mineral oxide type: $SiO_2$, $B_2O_3$, $CaO$, . . . .

According to the invention, in order to initiate the melting process, use is made of a bath of such a liquid which is conductive over the whole of the temperature range: $[\theta_1-\theta_2]$. In said bath, which is subjected to a suitable heating power, (the) constituent elements of the matrix sought after— elements which melt are added until the conductive mineral load sought after is obtained.

According to various embodiments:

said load is constituted of said added constituent elements; or said load is constituted of said added constituent elements and of other constituent elements which were found initially in the bath of conductive liquid; or said load is constituted of said added constituent elements and of at least one other constituent element which is obtained directly from said conductive liquid; or even said load is constituted of said added constituent elements, of other constituent elements which were initially found in the bath of conductive liquid, and finally of at least one other constituent element which is obtained from said conductive liquid.

According to the first two variants specified above, said conductive liquid intervenes only for the initiation of the process, it ensures said initiation but constitutes a pollution of the conductive mineral load constituted. It is then necessary to get rid of it, to carry out a dilution either by successive fillings/drainages or by a filling/drainage which is carried out continuously. This is set forth further on in the present text.

According to the two latter variants specified above, said conductive liquid intervenes both for initiating said process as well as in the preparation of the (first) molten conductive mineral load. It is more particularly preferred to carry out the process of the invention with such a bath of conductive liquid; said conductive liquid, a precursor of at least one constituent element of the matrix, being then used advantageously for preparing the conductive mineral load sought after. Under such conditions, all that has been introduced in the cold crucible is used for constituting the conductive mineral load. It is not necessary to carry out a drainage and it is entirely possible to introduce the constituent elements of the matrix at the same time as the elements to be immobilised in said matrix (e.g. waste materials to be immobilised in a glass matrix). This is also set forth in detail further on in the present text.

The intervention of a bath of a conductive liquid in the cold crucible has been mentioned. It is however in no way excluded from the context of the present invention to employ, concomitantly, several conductive liquids in said bath, which can generally be qualified as an initiation bath. In this context, it is obviously imperative that the various intervening liquids be compatible, that their mixture remain liquid and conductive over the whole of the temperature range: $[\theta_1-\theta_2]$. In the present description and annexed claims, the expression "a conductive liquid" is therefore to be understood as meaning "a single conductive liquid or a mixture of at least two conductive liquids".

The bath of conductive liquid, which is present in the cold crucible, enables, according to the invention, directly preparing a conductive mineral load without the need for heating means, within said cold crucible, other than the inductive heating means which are present.

Said bath, in said cold crucible, can be prepared according to various variants.

According to a first variant, the conductive liquid is generated, in situ, in said cold crucible, which has already been fed with a suitable composition, a precursor of said conductive liquid. Said cold crucible can thus be fed with an aqueous solution of a suitable salt or with a paste of said salt having a low water content. Said solution or paste, heated by induction, firstly dries. The salt obtained, always heated by induction, then melts and generates a molten salt bath; said molten salt is suitable as conductive liquid in the sense of the invention. It is in fact possible to incorporate a salt or a mixture of salts.

According to a second variant, the conductive liquid is prepared outside the cold crucible and is transferred into said cold crucible in order to generate said bath, which is useful for initiating the melting. The transfer of said conductive liquid is carried out in at least one suitable channel, which is generally heated, heat-insulated and resistant to corrosion . . . According to this variant, said cold crucible is fed directly with said conductive liquid. Thus, said cold crucible can be fed directly with a molten salt or with a mixture of molten salts suitable as conductive liquid in the sense of the invention.

As indicated above, the conductive liquid which intervenes, according to the invention, in the initiation of the melting process, can advantageously consist of a molten salt or a mixture of molten salts; a molten salt or a mixture which obviously meets the demands required; i.e. which becomes liquid and conductive within the temperature range $[\theta_1-\theta_2]$ defined above.

Said molten salt or mixture of molten salts, which is notably introduced into the cold crucible in the molten state or as a mixture of molten salts, as a paste or in solution, advantageously consists of a molten alkaline salt or of a mixture of molten alkaline salts.

Notably, the salt is a hydroxide, such as lithium hydroxide (LiOH), sodium hydroxide (NaOH) or potassium hydroxide (KOH); a nitrate; a nitrite or a mixture of these salts.

Within the context of a preferred variant of the process of the invention, it has been seen that the conductive liquid intervenes both for the initiation and for the preparation of the first molten conductive mineral load, as precursor of at least one constituent element of the matrix sought after. For the implementation of said preferred variant, it is therefore necessary that said conductive liquid be a precursor of at least one constituent element of said matrix. The intervention of such conductive liquids, precursors of at least one constituent element of said matrix, is therefore widely recommended within the context of the present invention. Thus, the use of a conductive liquid, which contains sodium, a precursor of $Na_2O$ (constituent element of the glass prepared) and notably that of sodium hydroxide (NaOH), is more particularly recommended, within the context of the implementation of the method of the invention, for preparing a matrix of mineral glass, as conductive liquid for constituting the initiating load in the sense of the invention. A eutectic sodium nitrate and nitrite mixture can also advantageously intervene in this context (of preparation of a glass matrix).

In the event of the intervention of such a conductive liquid, a precursor of at least one constituent element of the matrix sought after, the process of the invention is advantageously implemented as follows: during the initiation step, the additional constituent elements of said matrix are added (the element(s) of said matrix brought about by said conductive liquid are thus taken account of, as well as of the constituent element(s) of said matrix which have been able to be introduced beforehand into said conductive liquid), into the bath of conductive liquid (present in the cold crucible), the temperature of which is progressively increased (by virtue of heating by induction).

In the event of the intervention of such a conductive liquid, a precursor of at least one constituent element of a glass matrix sought after (which contains for example sodium, a precursor of $Na_2O$), for immobilising radioactive waste materials, said radioactive waste materials are added, at the same time as or after, advantageously at the same time as, said additional constituent elements of the (glass) matrix. Said waste materials can thus intervene in the first glass load which is constituted upon completion of said initiation step or during the constitution of said first glass load.

The additional constituent elements of the matrix are generally added progressively, advantageously as from the start of the increase in temperature of the bath of conductive liquid. It is however in no way excluded to add them to said bath brought to a temperature around or equal to $\theta_2$.

It has been seen that this variant of implementation of the method of the invention is particularly preferred. The conductive liquid which is present for initiating the melting is consumed, made use of, during the melting. It does not constitute a pollutant of the first conductive mineral load thus generated. Its intervention does not impose the implementation of any drainage (rinsing).

The first conductive mineral load, which is thus obtained rapidly upon the completion of such an implementation of the melting initiation step, can then be recovered. A glass load thus constituted, which contains radioactive waste materials, can notably be poured into a container. Care is however taken in order to keep a hot, conductive load stock in the cold crucible. Said stock is capable of ensuring, for the following load, the role that the conductive bath has ensured for the first load. Upon completion of the implementation of the initiation step, n loads can thus be treated successively.

In the event of the intervention of a "pollutant" conductive liquid, which is a non-precursor of at least one constituent element of the matrix sought after, another means of implementation of the method of the invention must be found. Another such means of implementation is, a priori, less interesting . . . It does however reveal to be interesting with respect to prior art initiation methods. It is hereby noted that another such means of implementation can however, for various reasons and exceptionally, also be implemented with a non-pollutant conductive liquid, a precursor of at least one constituent element of the matrix sought after. In this event, the precursor function of said conductive liquid is not made use of.

Another such means of implementation of the process of the invention comprises the addition of the constituent elements of the matrix sought after into the bath of conductive liquid, the temperature of which is progressively increased, and the continuation of this addition. continuously or discontinuously, to which a continuous partial drainage or discontinuous partial drainages are associated, until a suitable ("non-polluted") molten mineral load is obtained.

If said mineral load thus prepared is a glass load, intended for immobilising radioactive waste materials, it is conceived that said waste materials are introduced, within it, upon completion of its preparation.

Within the context of this other means of implementation, a certain volume of matrix must intervene, for a lost cause, for diluting the pollutant.

Said other means of implementation can be available, mainly, according to two variants set forth below.

According to a first variant: during the initiation step, the constituent elements of the matrix are added (all the constituent elements of said matrix, generally progressively, optionally in one or more loads, such that it may sometimes be considered that additional constituent elements of said matrix are added in a bath of conductive liquid which already contains some . . . ), into the bath of conductive liquid (present in the cold crucible), the temperature of which is increased progressively (by virtue of heating by induction). Upon completion of this preparation of the first load, said first polluted load is drained, partially, in order to keep a stock which enables continuing the heating by induction. Feeding the constituent elements of the matrix in is then started again, in doing so ensuring the dilution of the pollutant present in the stock. The drainage/filling cycle is made again until the pollutant content be judged acceptable.

If a conductive glass load is thus prepared, radioactive waste materials to be immobilised can then be added thereto.

According to a second variant: during the initiation step, the constituent elements of the matrix are added (all the constituent elements of said matrix, generally progressively, optionally in one or more loads, such that it may sometimes be considered that additional constituent elements of said matrix are added in a bath of conductive liquid which already contains some . . . ), into the bath of conductive liquid (present in the cold crucible), the temperature of which is progressively increased (by virtue of heating by induction), while at the same time draining, partially, continuously, the cold crucible of its load; a load thus constituted of said conductive liquid and of said molten matrix, the composition of which is variable (since it differs from that of said ("pure") conductive liquid towards the final composition of said molten matrix ("without trace" of conductive liquid)). This addition and this partial drainage are continued until a load, the pollutant content of which is judged acceptable, is obtained in the cold crucible. Said addition and said drainage are then stopped.

If a conductive glass load is thus prepared, radioactive waste materials can then be introduced therein.

According to this means of implementation, the ("pollutant") conductive liquid, useful for initiation, must be evacuated from the cold crucible. It is evacuated progressively, after having served its function: that of enabling the melting of the constituent elements of the matrix that are added. This removal of the "initiator" is an implementation which is more arduous and longer. This removal causes a loss of a certain volume of matrix. However, it renders the initiation of the melting possible without having need for additional heating means which are different from the inductive means. The removal is also implemented in a beneficial way for separating two very different campaigns of production of mineral matrices.

The first conductive mineral load, thus obtained upon completion of such an implementation of the initiation step of the melting, can then be recovered. A glass load, thus constituted, which contains radioactive waste materials, can notably be poured into a container. As indicated above, care will be taken in order to keep a stock of said load for initiating the melting of the second load and those thereafter.

A cold crucible comprises a system of electric heating by induction which is capable of functioning within a certain impedance range, called the "functioning range". The impedance at the poles of the inductor depends, for a given crucible geometry, on the resistivity and on the volume of the load.

Therefore, whatever the variant of implementation of the method of the invention, it is suitable that the conductive liquid intervene initially in an amount such that, in view of its resistivity, the resulting impedance at the poles of the inductor belong to the functioning range.

The initiation of the melting, with said conductive liquid, must not necessitate too great a broadening in the functioning range.

Advantageously, it is therefore sought such that the bath of conductive liquid constitute a load which is equivalent, almost identical, from the point of view of the induction heating process, to the conductive mineral load undergoing melting, and to the nominal temperature of the method of melting.

The person skilled in the art, upon considering the description above and the Examples below will have no difficulty in understanding the original concept of the method of the invention, in implementing it and in optimising said implementation.

The person skilled in the art will not have missed noting the great interest of the initiation process of the invention, of an easy implementation, which does not need additional heating means, which neither imposes a large modification of the device which is used classically. Said classical device mainly comprises the cold crucible and the inductive heating circuit; the induction coil being disposed around said cold crucible. Said cold crucible is obviously equipped with device(s) for introducing the constituent elements of the matrix and even elements to be immobilised in said matrix, as well as a casting device.

For the implementation of the method of the invention, a specific branch circuit is advantageously provided on the cold crucible, for its feeding in the conductive liquid or in a precursor material of said conductive liquid (e.g: an aqueous solution or a paste of a salt which is able to generate a molten salt).

The person skilled in the art has understood that the process of the invention, with original initiation step of a cold crucible induction melting, is suitable for preparing any type of mineral matrix and notably for preparing mineral matrices selected from glass, enamel and ceramic matrices. Said matrices can be prepared for themselves or for constituting coating or immobilising matrices. It has already been indicated that the process of the invention is advantageously carried out for preparing glass matrices intended for immobilising radioactive waste materials. It is however in no way excluded to carry out the process for preparing glass matrices, per se, even glass matrices intended for immobilising other types of product.

The method of the invention is illustrated by the Examples below, within the context of the vitrification of radioactive waste materials in glass matrices.

EXAMPLE 1

The process of the invention is carried out in a cold crucible constituted of a sectored bed plate, a sectored collar and of a dome at the level of the structure of which means for introducing products (constituent elements of nuclear glass, radioactive waste materials) are provided. The sectoring (arrangement of cooling channels within said bed plate and collar) is carried out in a way so as to let the electromagnetic field pass, and to prevent, as much as possible, horizontal loops of current in the metallic parts which cause a decease in the yield. The sectored collar is surrounded by an inductor.

Said cold crucible is designed in order to function with a load of glass of height $H_{glass}$=500 mm and of resistivity of 5 Ω.cm at 1,200° C.

The initiation step of the vitrification process of the invention is the following:
  the crucible is fed, at 100° C., with hydrated sodium hydroxide, which is liquid, (25% $Na_2O$, 75% $H_2O$, % by weight), having, at this temperature of 100° C., a resistivity of 0.7 Ω.cm;
  the transmission of power is made on 20 kg of said conductive hydrated sodium hydroxide (this 20 kg corresponding to about 5 kg of $Na_2O$), the temperature of which increases progressively until a molten NaOH—$H_2O$ mixture is obtained;
  the water is removed gradually during the temperature increase, and the resistivity of the molten liquid decreases;
  in order to compensate for this decrease in resistivity and to gradually obtain a nuclear glass composition in the cold crucible, 250 kg of a mixture composed of:
    $SiO_2$ 59%
    $Al_2O_3$ 4%
    $B_2O_3$ 18%
    $Na_2O$ 7%
    CaO 5%
    $ZrO_2$ 1%
    ZnO 3%
    $Li_2O$ 3% (% by weight)
  is added progressively to said sodium hydroxide bath.

The composition of said mixture was adjusted in order to take into account the in situ contribution of $Na_2O$ by the sodium hydroxide.

A basic glass load is obtained upon completion of these operations.

70 kg of radioactive effluents to be vitrified are incorporated in this basic glass load. Radioactive glass of the composition sought after is thus obtained which is of a resistivity of 5 Ω.cm at 1,200° C. This first glass load can then be cast. It is poured whilst at the same time conserving a stock of glass in the bottom of the cold crucible. Said stock enables treating the following load and those thereafter.

EXAMPLE 2

The process of the invention is implemented in a cold crucible which is identical to that of Example 1.

The initiation step of the vitrification process of the invention is the following:
  the crucible is fed with an eutectic mixture of 14 kg of sodium hydroxide and potassium hydroxide (51% NaOH— 49% KOH, % by mole; which corresponds to about 5 kg of $Na_2O$), melted at about 170° C.;
  the transmission of power is made on this amount (this bath) of molten liquid, the temperature of which increases progressively, and this leads to a decrease in its resistivity;
  in order to compensate for this decrease in resistivity and to gradually obtain a nuclear glass composition in the cold crucible, 250 kg of a mixture composed of:
    $SiO_2$ 59%
    $Al_2O_3$ 4%
    $B_2O_3$ 18%
    $Na_2O$ 5%
    CaO 5%
    $ZrO_2$ 1%
    ZnO 3%
    $Li_2O$ 3% (% by weight)
  is added progressively to said sodium hydroxide/potassium hydroxide bath.

The composition of said mixture was adjusted in order to take into account the in situ contribution of $Na_2O$ by the sodium hydroxide;
  a casting is made of this first inactive load which contains the undesirable element K. Care is taken in order to stop the casting so as to conserve enough glass in the cold crucible, in order to keep a stock of hot glass at the bottom of the crucible;

precursor glass mixture, having the above composition by weight, is added again;

as many casting/filling cycles as necessary are made in order to dilute the element K, until an acceptable content for the prepared glass.

Glass of basic composition sought after is obtained upon completion of said initiation step.

70 kg of radioactive effluents are then incorporated in this basic glass. Radioactive glass is thus obtained of composition sought after and of resistivity of 5 Ω.cm at 1,200° C. Implementing as in Example 1 can be done (casting of the load with constitution of a stock of glass; treatment of successive loads).

EXAMPLE 3

The process of the invention is carried out in a cold crucible which is identical to that of Example 1.

The initiation step of the vitrification process of the invention is the following:

the crucible is fed with 13 kg of a eutectic sodium nitrate and nitrite mixture (about 40% $NaNO_2$—60% $NaNO_3$, % by mole) molten at about 230° C.;

the transmission of power is made on this amount (this bath) of molten liquid, the temperature of which increases progressively, and this causes a decrease in its resistivity;

in order to compensate for this decrease in resistivity and to gradually obtain a nuclear glass composition in the cold crucible, 250 kg of a mixture composed of:

$SiO_2$ 59%
$Al_2O_3$ 4%
$B_2O_3$ 18%
$Na_2O$ 7%
$CaO$ 5%
$ZrO_2$ 1%
$ZnO$ 3%
$Li_2O$ 3% (% by weight)

is added progressively to said molten liquid.

The nitrates and nitrites contained in the liquid undergoing melting gradually decompose during the increase in temperature (above 800° C.), to give $Na_2O$.

The composition of said mixture was adjusted in order to take into account the in situ contribution of $Na_2O$ by said sodium nitrate and nitrite.

A basic glass load is obtained upon completion of this initiation step.

70 kg of radioactive effluent are incorporated in this basic glass load and implementation is then done as in Examples 1 and 2.

What is claimed is:

1. A process for preparing a molten mineral matrix by a direct cold crucible induction melting method from solid constituent elements of said mineral matrix, said solid constituent elements of said mineral matrix not being electrically conductive before melting, said process comprising the steps of:

(a) preparing a bath of a conductive liquid in an inductive cold crucible wherein said liquid is a molten salt or a mixture of molten salts, said conductive liquid being both a liquid and an electric conductor between a temperature θ of less than 600° C. and and a temperature $θ_2$ of at least equal to the temperature at which said solid constituent elements of said mineral matrix melt to generate a molten mineral matrix;

(b) inductively heating said conductive liquid to a temperature at least equal to $θ_2$; and (c) introducing solid constituent elements of said mineral matrix to said bath to generate a conductive molten mineral matrix from said solid constituent elements.

2. The process according to claim 1, characterised in that said bath of conductive liquid has been generated in said cold crucible.

3. The process according to claim 1, characterised in that said cold crucible has been fed directly with said conductive liquid.

4. The process according to claim 1, characterised in that said conductive liquid is a molten salt or a mixture of molten salts.

5. The process according to claim 1, characterised in that said conductive liquid is a molten alkaline salt or a mixture of molten alkaline salts.

6. The process according to claim 5, characterised in that said conductive liquid consists of a hydroxide, a nitrate, a nitrite, or a mixture of these salts.

7. The process according to claim 1, characterised in that said conductive liquid is a precursor of at least one constituent element of said matrix.

8. The process according to claim 7, characterised in that during said step (c), additional constituent elements of said matrix are added into said bath of conductive liquid, the temerature of which is progressively increased.

9. The process according to claim 8, characterised in that said process is implemented for preparing a glass matrix within the context of a process of vitrifying radioactive waste materials, and said radioactive waste materials are introduced, at the same time as the additional constituent elements of the matrix.

10. The process according to claim 8, characterized in that said process is implemented for preparing a glass matrix within the context of a process of vitrifying radioactive waste materials, said radioactive waste materials are introduced after the additional constituent elements of the matrix.

11. The process according to claim 1, characterised in that during said step (c), the solid constituent elements of said matrix are added into said bath of conductive liquid, the temperature of which is progressively increased, and this addition is continued, continuously or discontinuously, in association with, respectively, a continuous partial drainage or discontinuous partial drainages of the conductive liquid, until the molten mineral matrix is obtained.

12. The process according to claim 11, characterised in that said process is implemented for preparing a glass matrix within the context of a process of vitrifying radioactive waste materials, and said radioactive waste materials are introduced into the molten matrix.

13. The process according to claim 1, characterised in that said process is implemented for preparing a mineral matrix selected from glasses, enamels, and ceramics.

14. The process according to claim 1 characterised in that said process is implemented for preparing a glass matrix.

15. The process according to claim 14, characterised in that said process is implemented within the context of a process of vitrifying radioactive waste materials.

16. The process claim 14, characterised in that said conductive liquid contains sodium, a precursor of $Na_2O$.

17. The process of claim 1 wherein said temperature $θ_1$ is between about 100 and about 500° C.

* * * * *